(No Model.)
W. S. SHARPNECK.
CAGE FOR JOURNAL BOXES.
No. 409,308.  Patented Aug. 20, 1889.
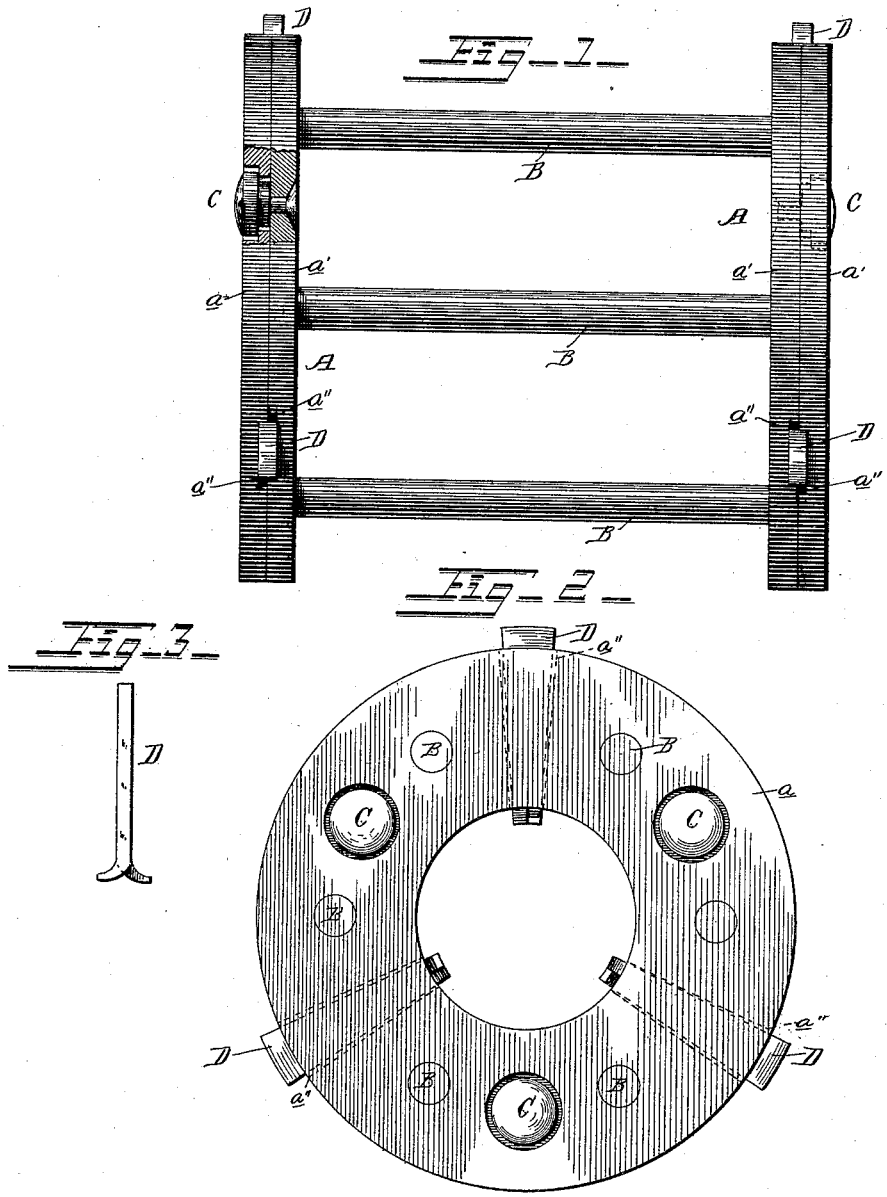

UNITED STATES PATENT OFFICE.

WILLIAM S. SHARPNECK, OF CHICAGO, ILLINOIS.

CAGE FOR JOURNAL-BOXES.

SPECIFICATION forming part of Letters Patent No. 409,308, dated August 20, 1889.

Application filed January 9, 1889. Serial No. 295,855. (No model.)

*To all whom it may concern:*

Be it known that I, WILLIAM S. SHARPNECK, a citizen of the United States, residing at Chicago, in the county of Cook and State of Illinois, have invented certain new and useful Improvements in Cages for Journal-Boxes, &c., of which the following is a specification, reference being had therein to the accompanying drawings.

This invention is designed more particularly as an improvement of a certain part of the improved journal-box shown in my patents, Nos. 373,756 and 392,465, which part may be designated as the "cage;" but the invention may be applied to other uses where similar devices are required.

The invention consists in the peculiar construction, arrangement, and combination of parts hereinafter more fully described, and then definitely pointed out in the claims.

In the accompanying drawings, Figure 1 is a side view of the cage without the rollers. Fig. 2 is an end view of the same. Fig. 3 is an edge view of a key detached.

Heretofore it has been the practice to secure the parts of the cage together either by nuts on the ends of the shafts on which the anti-friction rollers run or else to rivet the ends of the same. Both of these devices are objectionable, because the nuts, under the tremendous amount of vibration that the box is subjected to when in use in a railroad-car, are bound to shake loose, and the riveting prevents the cage being taken apart should it be required at any time and for any reason. Besides this, both forms of fastening necessitate the turning down of the shafts to form shoulders on each end, which weakens them, thereby rendering them more likely to break, all of which difficulties are avoided by my present invention.

Referring now to the details of construction in the drawings, A represents the cage ends, each formed of two disks $a$ and $a'$.

B shows the rods or shafts around which the anti-friction rollers run, which shafts are simply straight rods of the same size for their entire lengths, although they may, if required for any purpose, have shoulders formed on them.

Each pair of disks are held together by flat-headed rivets C, one end of each being firmly riveted in the inner disk $a'$, while the other end works loosely in a hole in the disk $a$, the holes in said disk $a$ being sufficiently large to allow of a slight motion of one disk upon the other. In each disk is cut a series of keyways $a''$, to receive keys or wedges D, by driving in which a slight rotary motion of one disk over the other is given, which, as the keys are driven "home," grip the rods or shaft like a vise, and thus securely hold them in position. The keys are split at their small ends, as shown at Fig. 2, so that by opening that end, as shown in Fig. 3, the key will be securely fastened.

To take the cage apart, it is only necessary to straighten the ends of the keys D and knock them out of their seats, by which means the shafts or rods will be loosened and will drop out of the ends.

It will thus be seen that by my construction I provide a ready means of fastening such cages together which not only allows of the rods being left of their full size for their entire length, but much facilitates the "assembling" of the parts or the separation of the same when desired.

Any other desired means for holding together the disks may be substituted for the rivets C, or they may be dispensed with entirely under some circumstances.

What I claim as new is—

1. The combination, with rods B, of two disks, and wedges for giving one of said disks a rotary motion around the other, thus gripping the rods, substantially as described.

2. The combination of the rods B and the end pieces A, each formed of two disks $a$ $a'$, provided with rivets C for holding them together, with the wedges D, set in keyways formed in said disks, substantially as described.

In testimony whereof I affix my signature, in presence of two witnesses, this 7th day of January, 1889.

WILLIAM S. SHARPNECK.

Witnesses:
 A. P. BOYNTON,
 S. B. BOYNTON.